United States Patent

Muller et al.

[15] 3,674,144

[45] July 4, 1972

[54] GRAVITY SEPARATION OF GRANULAR MATERIALS

[72] Inventors: Leslie Dyne Muller; Charles Philip Sayles, both of Stevenage, Hertfordshire; Richard Henry Mozley, Penzance, Cornwall, all of England

[73] Assignee: Warren Spring Laboratory, Gunnels Wood Road, Foundry House, Newlyn, England

[22] Filed: March 13, 1969

[21] Appl. No.: 811,278

Related U.S. Application Data

[63] Continuation-in-part of Ser. No. 555,383, June 6, 1966, abandoned.

[52] U.S. Cl. ............................................209/468, 209/475
[51] Int. Cl. ..............................................B07b 3/12
[58] Field of Search.................209/454, 457, 459, 474, 475, 209/427, 468, 423, 466

[56] References Cited

UNITED STATES PATENTS

| | | | |
|---|---|---|---|
| 923,455 | 1/1909 | Stebbins | 209/474 X |
| 1,068,162 | 7/1913 | Payne | 209/466 |
| 1,634,898 | 7/1927 | Delamater | 209/475 |
| 2,154,784 | 4/1939 | Stump | 209/474 |
| 2,275,849 | 3/1942 | Fraser | 209/466 |
| 2,612,997 | 10/1952 | Harvengt | 209/457 |
| 2,644,583 | 7/1953 | Cannon et al. | 209/459 |
| 2,905,322 | 9/1959 | Cannon | 209/459 X |
| 3,105,040 | 9/1963 | Wood | 209/466 |
| 3,367,501 | 2/1968 | Eveson | 209/466 X |
| 3,379,310 | 4/1968 | Reichert | 209/459 |
| 1,695,369 | 12/1928 | Davis | 209/423 |

Primary Examiner—Tim R. Miles
Attorney—Larson, Taylor and Hinds

[57] ABSTRACT

Apparatus for gravity separating dry granular materials has an inclined surface of porous material. To facilitate the flow of materials down the incline and the sinking of materials of higher specifice gravity or of larger size to the bottom of the stream, a gas is passed through the porous surface to fluidize the granular materials. The surface may take the form of a chute with tapering sidewalls and porous base or a circular funnel-shaped vessel of porous material.

2 Claims, 5 Drawing Figures

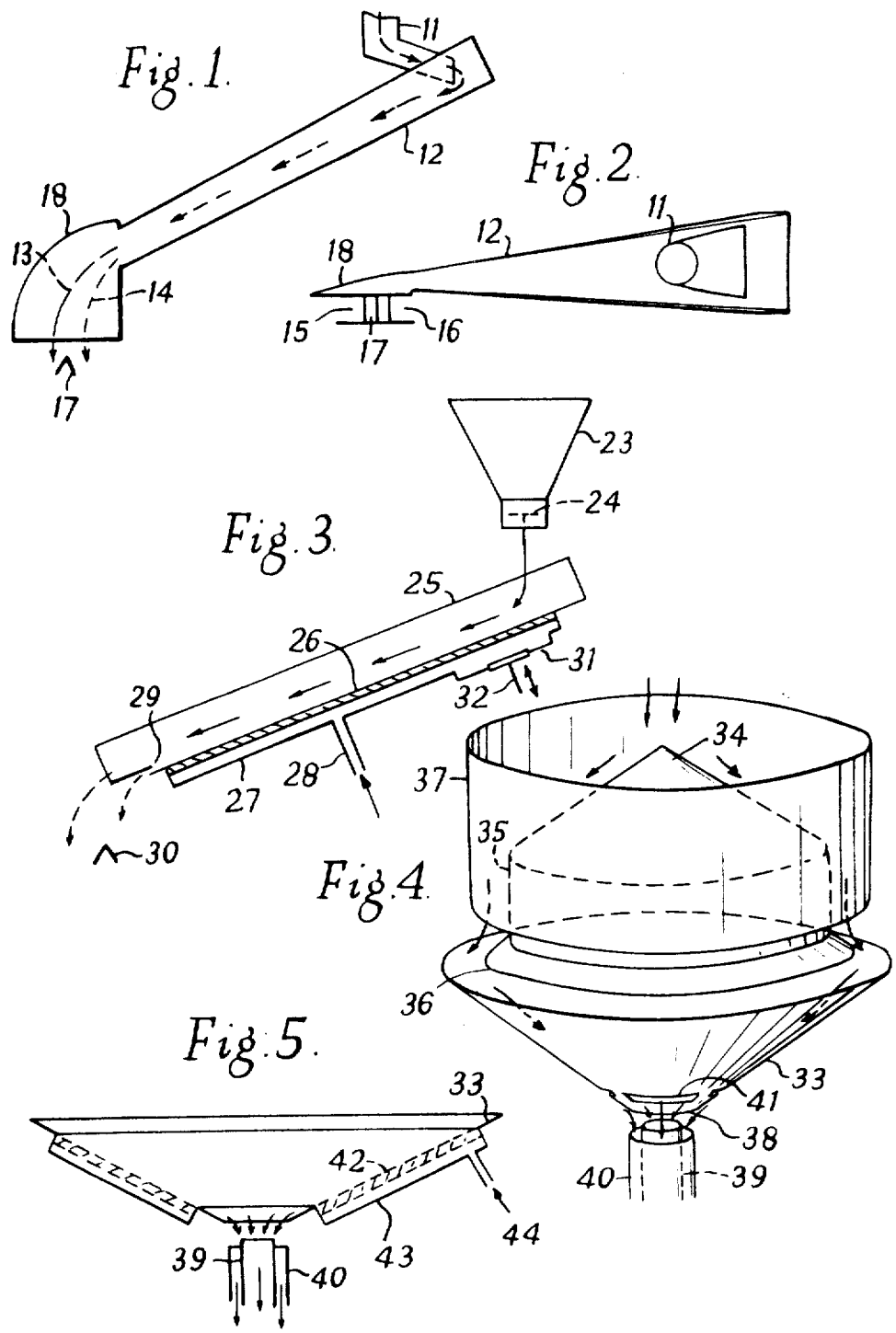

GRAVITY SEPARATION OF GRANULAR MATERIALS

REFERENCE TO RELATED APPLICATION

This application is a continuation-in-part of our application Ser. No. 555,383 filed June 6, 1966, now abandoned.

The present invention relates to the separation of granular materials of different densities or sizes, for instance, the separation of crushed ore into its constituent minerals. When the materials are of uniform density but of different sizes the operation is often referred to as classifying.

Mineral separation by gravity methods in a pinched-sluice type of separator is already well known and two examples are represented by the tapering chute and the Reichert cone. In each of these, the material to be separated travels down a slope during which stratification occurs and as a result the different density components are projected different distances off the end of the slope and can be separated into different receptacles. However, dry materials cannot be separated in this way as they do not flow down the slope properly and indeed the material merely builds up and blocks the separator.

Separators are known in which separation is carried out by intermittently blowing air from beneath the materials. Such a separator is suitable for separating materials having a relatively great density difference as the lighter particles are blown upwardly away from the heavier particles. However, materials having similar densities are not efficiently separated by such apparatus. The chief object of the present invention is to improve separators of this general type and make their operation more efficient and more rapid so that a greater volume of material can be dealt with in the same time.

According to the present invention, in the gravity separation of minerals in which the materials to be separated pass down an incline under the influence of gravity, the separation is enhanced by fluidization of downpassing materials by means of fluid introduced beneath the said materials. Preferably the fluid used to fluidize the materials is a gas, usually air.

According to a further development of the invention, pulses of flow are superimposed upon a substantially constant flow of the fluid employed to fluidize the materials to be separated.

The invention will be better appreciated from the following description which should be taken in conjunction with the accompanying drawings in which:

FIG. 1 is an elevation in section of a known form of pinched sluice separator;

FIG. 2 is a plan view of FIG. 1;

FIG. 3 is a sectional elevation of a pinched sluice, as modified according to the invention;

FIG. 4 is a trimetric view of a Reichert cone type of separator;

FIG. 5 is a sectional elevation of the lower part of FIG. 4 incorporating the improvement according to the invention.

Referring to FIGS. 1 and 2, in a tapering chute separator of known kind, pulp is fed to the separator through pipe 11, the pulp being usually of 50–60 percent solids content in water. The pulp passes down the sluice 12, the floor usually being at an angle of about 12°–20° to the horizontal. During passage down the sluice the solids in the pulp become stratified such that superimposed layers are formed of different densities, the densest material being at the bottom, i.e. nearest the floor of the separator. At the delivery end—the pinch of the sluice—the layers may be made to diverge and can be directed into different hoppers. The diagram shows two streams corresponding to a pulp containing materials of two different densities. Stream 13 contains most of the lighter material and is directed into a receiver 15 by a splitter 17, while the heavier material in stream 14 is directed into receiver 16. Separation and direction of the streams is assisted by means of a fan plate 18, although other means may be used.

FIG. 3 illustrates a pinched sluice modified according to the invention. Here, dry material for separation is fed from a hopper 23 by a vibratory conveyor 24 to the top of a tapering chute. As mentioned above, if dry material is fed to a separator of this kind, no separation takes place and indeed the material merely builds up and blocks the sluice. According to the modified construction, the floor of the chute 25 is constructed of porous tile 26 or material of like properties. This porous floor is enclosed below by a fluid-tight box 27 to which air under pressure is fed through a pipe 28. Air passing through the porous floor at a suitable rate fluidizes the material that is to be separated and it flows down the sluice freely, stratification of the components of different density taking place during the flow. In contrast to known separators in which the air has a separating effect by blowing the lighter materials upwardly away from the heavier materials, in this invention the air is not intended to have a separating effect. All the air does is make the mixture of materials act like a fluid. The effect of fluidizing the materials is that the heavier or larger size particles can more easily move to the bottom of the layer under the influence of gravity, the lighter particles being displaced upwardly by the heavier particles. FIG. 3 shows a heavier component being separated from a lighter (or a larger component from a smaller in the case of a classifier) by means of a slot 29 and a splitter 30 may also be used as shown, if desired.

There is, of course, a boundary region between the layers of separated material where the two different materials are intermixed. The deeper the layer of materials on the slope, the less will be the depth of this boundary region in proportion to the depth of the layers of separated material and it is for this reason that the area of the floor is decreased with distance away from the top of the slope, by tapering the sidewalls.

For efficient separation, the width of the chute at the top must be at least 5 times and the length of the chute must be at least 30 times the width of the chute at the bottom. Suitable dimensions are a length of 4 feet, a width at the top of 7 inches and a width at the bottom of one-half inch. The chute must, of course, be of sufficient length to allow time for the material to separate.

With a separator of the same dimensions as those set out above, fluidization according to the invention can improve the throughput by a factor of the order of 3. To achieve this result, the flow of air required is of the order of 1,200 to 1,500 cu. ft. per hour. It is impossible to improve the separation further by superimposing upon the continuous flow of air through the porous floor 26 pulsations which may be alternately positive and negative. This may be effected, for example, by means of a flexible diaphragm 31 set into the box 27 and reciprocable by any suitable means through the rod 32. The pulses assist separation by a jigging effect. The improvement is likely to be only marginal where the materials to be separated are of substantially different density (or size) but appreciable improvement over unpulsed fluidization will result where the density (or size) difference is small. It has been found that with a separator according to the invention the inclination to the horizontal may usefully be in the range of 6°–15°, that is today, less than with the known type of separator.

Further improvement in the separation is obtained by vibrating the separator along its axis. This enables materials as coarse as one-eighth inch (approx 6 mesh) to be processed provided that there is an adequate density difference between the materials to be separated. The vibration is specifically designed to assist movement of course or heavy particles which fail to respond to fluidization and which therefore build up in the separator.

The principle of the invention as described for the chute may be applied to a Reichert cone by making the whole or part of the surface of the cone porous and pumping gas up through it. FIGS. 4 and 5 illustrate this development of the invention, FIG. 4 showing the general construction of a Reichert cone and FIG. 5 indicating more particularly the fluidizing arrangements.

The separating element here is a funnel-shaped or hollow inverted conical vessel 33. The material to be separated is fed to the rim of the cone 33 in an annular stream through a suitable distributor. The distributor as shown includes a feed cone 34 to the apex of which the material is supplied and this cone carries a cylindrical skirt 35 terminating in a frusto-conical flange 36. The material is further guided by the enclosing cylinder 37. This arrangement is only exemplary and other means of feeding material to the rim of the cone 33 may equally well be used, for example a fluidized peripheral feeder. The separator cone 33 is truncated and acts similarly to a number of chutes arranged in a circle and with the side walls removed. Stratification occurs, in the same way as described, above and concentric streams of different density (or size in the case of a classifier) emerge from the orifice 38 to be carried away through adjustable concentric pipes 39,40. Alternatively, the stream may be separated by means of slots as indicated at 41.

Improvement of separation by fluidization according to the invention may be applied to the hollow cone separator in the same way as to the chute. FIG. 5 shows how the greater part of the surface of the separator cone 33 is made of porous material 42 through which fluid is forced via the enclosing box 43 from the pipe 44. As with the chute, the hollow cone separator is preferably fed with dry material which is fluidized with air. Similarly pulsations may be superimposed upon the steady flow of fluidizing substances, as described above. Moreover, the feed or distributor cone may also be provided with a porous floor to permit fluidization to take place and improve the regularity of the feed.

The generators of the hollow cone surface may conveniently make and angle of 10° to 15° with the horizontal as indicated in FIG. 5. A cone having a maximum diameter of 2½ feet might be expected to increase the throughput by a factor of the order of 3, as in the case of the improved pinched sluice.

Certain mixtures of materials, for example chopped copper wire and its associated but released plastic or rubber insulation, will not flow even on the improved separator described above. However, such materials can be induced to flow by adding a further granular medium such as sand to the mixture. The products of the seperator in this case are mixed with the further material which is removed, for example by screening.

We claim:

1. Gravity separating apparatus for separating dry granular materials of differing density or size, said apparatus being of the type wherein separation occurs as a result of movement of the higher density or larger granules of material relative to lower density or smaller granules of material primarily under the influence of gravity, comprising: a downwardly inclined porous surface, at least substantially the entire area of which is porous and wherein the dimension of said surface across the direction of said downward incline decreases with distance from the upper end of the inclined surface so that the depth of materials on the surface increases as the materials pass down the surface; means to introduce said dry granular material to the upper end of said inclined surface; means to continually pass a gas through said porous surface to fluidize said dry granular material over at least substantially the entire area of said surface, the last said means being operable such that the flow of the gas through the porous surface is such that substantially the sole function of said flow is to cause the said dry granular material to flow along said surface like a fluid to facilitate separation of the material primarily by gravity by the sinking of materials of higher density to the bottom of the stream of materials flowing down the surface relative to the lower density granules of the stream, all of said granules remaining in the stream until the stream reaches the lower end of said surface; means to permit at least substantially all of said dry granular material introduced to the upper end of said surface to traverse said surface and to flow over the lower end thereof; means adjacent the lower end of said inclined surface to separate the dry granular material flowing therefrom into at least two fractions of different density or size wherein the lower density or smaller granules are projected further from the said lower edge than the higher density or larger granules; and means to receive said separated fractions, wherein said surface comprises the inner surface of a circular funnal or shaped vessel, said vessel tapering inwardly downwards and wherein concentric tubes are provided beneath the vessel for receiving the separated fractions.

2. Apparatus according to claim 1 further including means to superimpose pulsations on said gas passing through said porous surface.

* * * * *

UNITED STATES PATENT OFFICE
CERTIFICATE OF CORRECTION

PATENT NO. : 3,674,144
DATED : July 4, 1972
INVENTOR(S) : Leslie Dyne Muller et al It is certified that error appears in the above–identified patent and that said Letters Patent are hereby corrected as shown below:

On the title page, delete:

"[73] Assignee: Warren Srping Laboratory
Gunnels Wood Road, Foundry
House, Newlyn, England"

Signed and Sealed this

Fourth Day of August 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 3,674,144
DATED : July 4, 1972
INVENTOR(S) : Muller

It is certified that error appears in the above-identified patent and that said Letters Patent are hereby corrected as shown below:

On the title page, please add:

--[30]  Foreign Application Priority Data
        June 8, 1965   /GB/   United Kingdom
        ..... 24224/65--.

Signed and Sealed this

Twelfth Day of June 1984

[SEAL]

Attest:

GERALD J. MOSSINGHOFF

Attesting Officer

Commissioner of Patents and Trademarks